(No Model.)

T. A. WATSON.
Telephone Signal Apparatus.

No. 233,899. Patented Nov. 2, 1880.

Witnesses:
N. E. C. Whitney.
Arthur Reynolds.

Inventor.
Thomas A. Watson
by Crosby & Gregory Attys

UNITED STATES PATENT OFFICE.

THOMAS A. WATSON, OF EVERETT, MASSACHUSETTS.

TELEPHONE SIGNAL APPARATUS.

SPECIFICATION forming part of Letters Patent No. 233,899, dated November 2, 1880.

Application filed July 26, 1880. (No model.)

*To all whom it may concern:*

Be it known that I, THOMAS A. WATSON, of Everett, county of Middlesex, State of Massachusetts, have invented an Improvement in Telephone Signal Apparatus, of which the following description, in connection with the accompanying drawings, is a specification.

My invention relates to telephone signal apparatus, and is embodied in a signal apparatus in which a magneto-generator is employed to produce some or all of the electric currents used for signaling purposes.

In some of the apparatus of this class a large permanent magnet is used, together with a revolving or other suitably-arranged armature, to generate electric currents for operating signaling-instruments at other stations.

A signal-bell is employed to receive signals from other stations, and this bell is usually placed in the same case with the generating apparatus, they forming a single compound instrument. The signal-bell is operated by an electro-magnet, and its armature provided with a bell-hammer, and in order to operate properly by the alternate reversed current produced by a generator such as hereinbefore described, the armature should be polarized, so that the alternate currents of reverse polarity will set the armature in vibration by the alternate attraction and repulsion of the poles of the magnet. The armatures of the signal electro-magnets have hitherto usually been polarized by a small permanent magnet, the said armatures being pivoted in one pole of the magnet and of the same polarity therewith.

My invention consists in so arranging and combining the signal electro-magnet and its armature with the large or generator permanent magnet that the latter serves to polarize the armature of the signal-magnet, and thus obviate the necessity of the small magnet used only for this purpose, thereby rendering the apparatus less expensive and more compact and convenient.

The signal-magnet armature is placed at a sufficient distance from the poles of the magnet to be affected thereby not too strongly.

Figure 1:
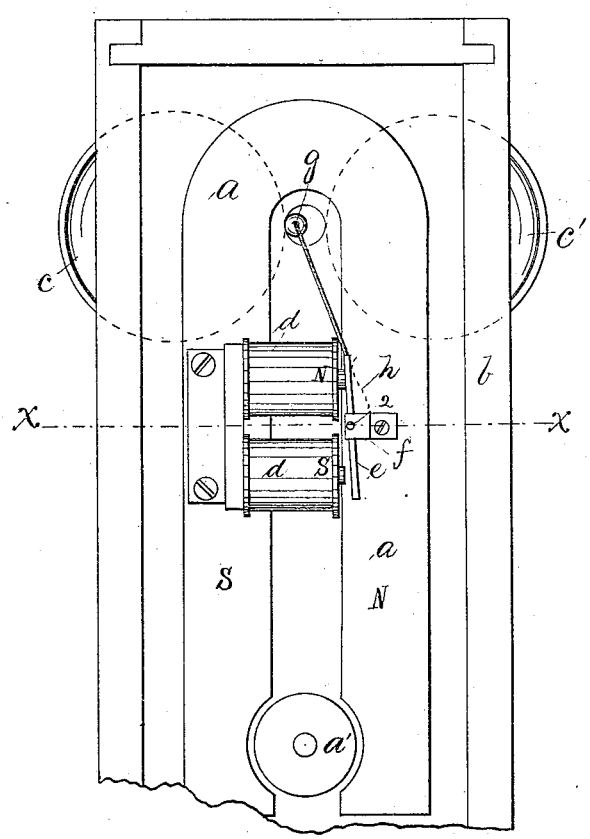
Figure 2:
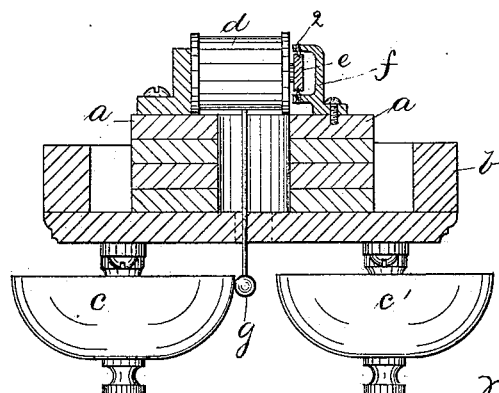

Figure 1 is a rear view of a sufficient portion of a signal apparatus to illustrate my invention; and Fig. 2, a transverse section thereof on line $x \, x$, Fig. 1.

The main generator-magnet $a$, provided with an armature and induction-coils, (shown as a Siemens armature,) $a'$, to generate an electric current or impulse, or series of impulses, in any usual manner, to operate a signal at some other point, is inclosed in a suitable case, $b$, which also sustains the bells $c \, c'$, which are intended to be operated from another point. The bells $c \, c'$ are rung by an electro-magnet, $d$, and its armature $e$, pivoted at 2 between the poles thereof in a bracket, $f$, on the magnet $a$, and provided with a bell-hammer, $g$, in proper position to strike the bells $c \, c'$ in its movement, caused by the vibration of the said armature on its pivot.

It is necessary for its proper operation that an armature pivoted in this manner should be polarized, since if it were neutral both its ends would be attracted alike by the poles of the magnet opposite thereto, and no movement would ensue when the magnet is alternately magnetized and demagnetized, or its polarity reversed. If, however, it is polarized, being, for example, in the position shown in Fig. 1, and of north polarity, and a current be passed through the coils of the magnet $d$ in such direction as to magnetize its cores with the polarity indicated by the letters N S, the pole S will attract, and the one N repel, the adjacent end of the armature $e$, and it will be vibrated on its pivot 2, causing the hammer $g$ to strike the bell $c'$, after which, if the polarity of the magnet $d$ is reversed, it will vibrate in the opposite direction to strike the bell $c$; or a spring, $h$, may be used to vibrate the armature in the opposite direction when the magnet $d$ is merely demagnetized without reversing its polarity. In signal apparatus of this kind the armature $e$ has been polarized by a small permanent magnet, the electro-magnet $d$ and connected apparatus occupying a separate portion of the frame-work or inclosing-case $b$.

By pivoting the armature $e$ upon the main generating-magnet $a$, as shown, it is suitably polarized thereby, and a separate polarizing-magnet is unnecessary, while the whole signaling apparatus is much more compact and neat in appearance, and cheaply constructed. The armature $e$ need not necessarily be pivoted at its middle, as shown, nor its supporting-bracket $f$ connected with the magnet $a$ in the precise arrangement illustrated, the essential feature of my invention being to so combine and arrange, in a signal apparatus, a generator-magnet and a tongue capable of vibrating to actuate a bell-hammer, that the said tongue may be polarized by the main generator-magnet, and the usual special polarizing-magnet dispensed with. The cores of the electro-magnet $d$ are also somewhat polarized by their proximity to the main magnet $a$, such polarization being desirable.

I claim—

1. In a telephone signal apparatus, a permanent magnet, and armature therefor, to generate magneto-electric currents to operate signals at other connected points or stations, and a vibrating tongue, of iron, to actuate the bell-hammer of a receiving-signal operated by electric currents from other connected points or stations, the said tongue being arranged in connection with the said generator-magnet, as described, to be properly polarized thereby, substantially as and for the purpose set forth.

2. In a telephone signal apparatus, the main generator-magnet and signal-operating electro-magnet, and its armature supported on the said main magnet and polarized thereby, substantially as described.

In testimony whereof I have signed my name to this specification in the presence of two subscribing witnesses.

THOMAS A. WATSON.

Witnesses:
    JOS. P. LIVERMORE,
    N. E. C. WHITNEY.